(12) United States Patent
Hyun (10) Patent No.: US 8,886,194 B2
(45) Date of Patent: Nov. 11, 2014

(54) DYNAMIC ACCESS NETWORK SELECTION METHOD AND APPARATUS IN WIRELESS COMMUNICATION SYSTEM

(71) Applicant: Samsung Electronics Co., Ltd, Gyeonggi-do (KR)

(72) Inventor: Jongsik Hyun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/745,245

(22) Filed: Jan. 18, 2013

(65) Prior Publication Data

US 2013/0183975 A1 Jul. 18, 2013

(30) Foreign Application Priority Data

Jan. 18, 2012 (KR) .................. 10-2012-0005602

(51) Int. Cl.
H04W 36/22 (2009.01)
(52) U.S. Cl.
CPC .................... *H04W 36/22* (2013.01)

USPC ........................................ 455/436; 455/456.1
(58) Field of Classification Search
USPC ............ 455/436, 456.1, 456.6; 370/331, 332
See application file for complete search history.

(56) References Cited

U.S. PATENT DOCUMENTS

2011/0206003 A1* 8/2011 Wu ............................... 370/331

\* cited by examiner

*Primary Examiner* — Sam Bhattacharya (57) ABSTRACT

An access network selection method and apparatus is provided for selecting an access network dynamically in a wireless communication system. The access network selection method of a terminal in a wireless communication system supporting attach to at least two access networks simultaneously in a same area according to the present disclosure includes detecting an event triggering access network reselection of the terminal; selecting a target access network for the terminal to move; generating a fake measurement report message including a radio channel measurement result of a source access network is weaker than a radio channel measurement result of the target access network; and performing handover to the target access network by transmitting the fake measurement report message.

20 Claims, 7 Drawing Sheets

DYNAMIC ACCESS NETWORK SELECTION METHOD AND APPARATUS IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application No. 10-2012-0005602 filed on Jan. 18, 2012, in the Korean Intellectual Property Office, the contents of which is incorporated herein by reference.

TECHNICAL FIELD OF THE INVENTION

The present disclosure relates to a wireless communication system and, in particular, to a method and apparatus for selecting an access network dynamically in a wireless communication system.

BACKGROUND OF THE INVENTION

Mobile communication systems provide the subscribers with voice communication services on the move. With the rapid advance of technologies, the mobile communication systems have evolved to support high speed data communication services as well as the standard voice communication services. However, the limited resource and user requirements for higher data rate in the current mobile communication system spurs the evolution to more advanced mobile communication system.

Typically, a terminal having the capability of accessing multiple types of radio access networks (e.g. simultaneously overlaid 2G, 3G, and 4G radio access networks) to connect to a data network selects one of the access networks in a predetermined order. For example, if the access priority is assigned in the order of 4G >3G >2G, the terminal selects the network to attach in descending order of priority. As far as the coverage of the attached access network is maintained, the terminal does not change the access network. That is, if it is located in an overlaid coverage of the 2G, 3G, and 4G access network, the terminal selects 4G access network first to perform attach procedure and maintains the attach to the 4G access network as far as the coverage of the 4G access network is maintained.

However, if a large number of 4G-preferred terminals gather in a specific area selects 4G access network competitively, this makes it difficult for the user to use a service, even the service generates relatively small traffic like such as email and messenger due to the overload situation on the 4G network.

Also, some users can prefer the stable 3G/2G circuit switched (CS) service to the mobile Voice Over Internet Protocol (mVOIP) on the 4G network and other users can use the email and messenger generating small traffic more frequently than the other services.

There is therefore a need of a method capable of selecting an access network for receiving the intended service dynamically according to the user's network preference and type of the service to be provided.

SUMMARY OF THE INVENTION

To address the above-discussed deficiencies of the prior art, it is a primary object to provide a method and apparatus for selecting an access network dynamically according to the services to be provided by designating preferred access networks in association with application, service type and traffic amount.

In accordance with an aspect of the present disclosure, an access network selection method in a wireless communication system supporting attach to at least two access network simultaneously in a same area includes detecting an event triggering access network reselection of the terminal, selecting a target access network for the terminal to move, generating a fake measurement report message indicating that a radio channel measurement result of a source access network is weaker than a radio channel measurement result of the target access network; and performing handover to the target access network by transmitting the fake measurement report message.

In accordance with another aspect of the present disclosure, a terminal for selecting an access network dynamically in a wireless communication system supporting attach to at least two access network simultaneously in a same area includes a radio communication unit configured to communicate signals with the access network; and a control unit configured to control detecting an event triggering access network reselection of the terminal, selecting a target access network for the terminal to move, generating a fake measurement report message indicating a radio channel measurement result of a source access network is weaker than a radio channel measurement result of the target access network, and performing handover to the target access network by transmitting the fake measurement report message.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication technology. Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
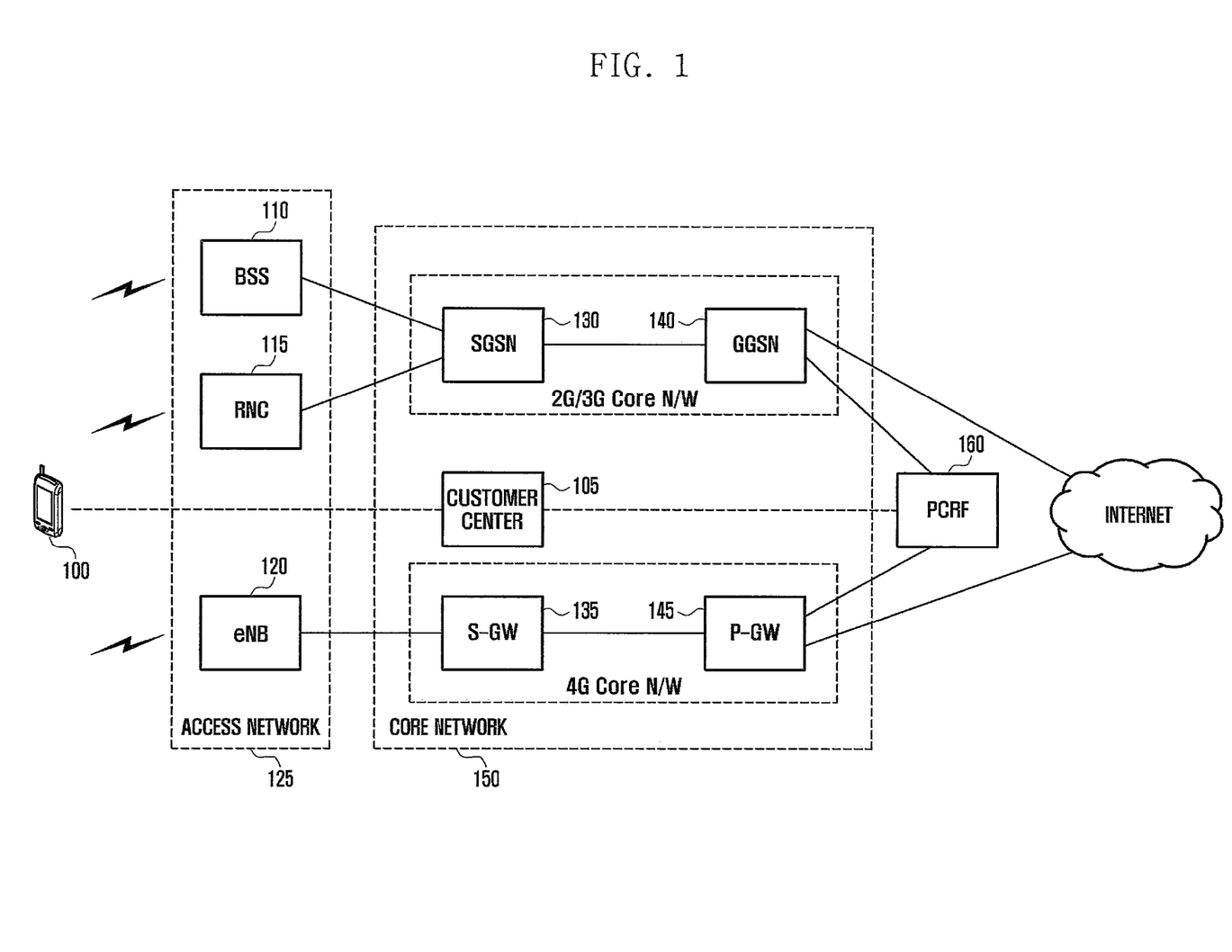
FIG. 1 is a diagram illustrating the architecture of the wireless communication system to which the dynamic access network selection method is applied.

FIG. 1 is a diagram illustrating the architecture of the wireless communication system to which the dynamic access network selection method is applied. As shown in FIG. 1, the wireless communication system includes a terminal 100, an access network 125 and a core network 150.

The terminal 100 roams and attaches to the access network to request the access network 125 for service. According to an embodiment of the present disclosure, the terminal 100 can configure a default access network, a preferred access network and the access network to move depending on the network situation. Descriptions on these networks are made later in detail. The terminal 100 is capable of requesting for access network switch, i.e. handover.

The Customer Center 150 manages the terminal 100, i.e. the subscriber-preferred access network information per service. The Customer Center 105 communicates with the terminal 100 to configure the dynamic access network selection policy and notifies the policy and Charging Resource Function (PCRF) 160 of the configured policy.

The access network 125 establishes a radio channel with the terminal 100 and controls radio resource. For example, the access network 125 generates and broadcasts the system information including control information necessary within the cell and allocates radio resource for communicating data and control information with the terminal 100. The access network 125 is also capable of receiving channel measurement results about the current and neighbor cells transmitted by the terminal 100 to make a handover decision and send the terminal a handover command.

The access network 125 can comprise 2nd Generation (2G), 3rd Generation (3G), and 4th Generation (4G) access networks. In this case, the base station managing the 2G access network is referred to as Base Station Subsystem (BSS) 110, the base station managing the 3G access network as Radio Network Controller (RNC) 115, and the base station managing the 4G access network as enhanced Node B (eNB) 120.

According to an embodiment of the present disclosure, the access network 125 is capable of detecting an abnormal communication situations and handing over the control of the terminal 100 to another access network.

The core network 150 is connected with the access network 125 through cable and responsible for subscriber data management, interoperation with other networks and Internet access. In the following, descriptions are made of the nodes constituting the 2G, 3G and 4G core networks.

The Serving GPRS Support Node (SGSN) 130 is responsible for Mobility Management, Session Management and packet processing in the 2G/3G network. According to an embodiment of the present disclosure, the SGSN 130 is capable of detecting abnormal communication situation and handing over the control of a terminal to another access network.

The Serving Gateway (S-GW) 135 is responsible for packet processing of 4G network and working as a mobility anchor in handover between base stations or roaming among different radio networks. According to an embodiment of the present disclosure, the S-GW 135 is capable of detecting abnormal communication situations and handing over the control of a terminal to another access network.

The Gateway GPRS Support Node (GGSN) 140 interoperates with Internet for 2G/3G subscribers. According to an embodiment of the present disclosure, the GGSN 140 is capable of detecting abnormal communication situations and handing the control of a terminal to another access network using the received subscriber-preferred access network information and Deep Packet Inspection (DPI) function.

The Packet Data Network Gateway (P-GW) 145 is responsible for allocating IP address to the terminal 100 and packet data-related function of the core network. The P-GW 145 is also capable of working as a mobility anchor for handover between 3GPP radio network and non-3GPP radio network. The P-GW 145 is also responsible for determining the bearer bandwidth for the subscriber and packet data forwarding and routing function. The P-GW 145 is also capable of interoperating with Internet for providing the 4G subscribers with Internet access service. According to an embodiment of the present disclosure, the P-GW 145 is also capable of detecting abnormal communication situations and handing the control of a terminal to another access network using the subscriber-preferred access network information received from the PCRF 160 and the DPI function.

The Policy and Charging Resource Function (PCRF) 160 manages Quality of Service (QoS) per subscriber. According to an embodiment of the present disclosure, the PCRF 160 interoperates with the Customer Center 105 to provide the GGSN 140 and P-GW 145 with the terminal-preferred access network information.

Figure 2:
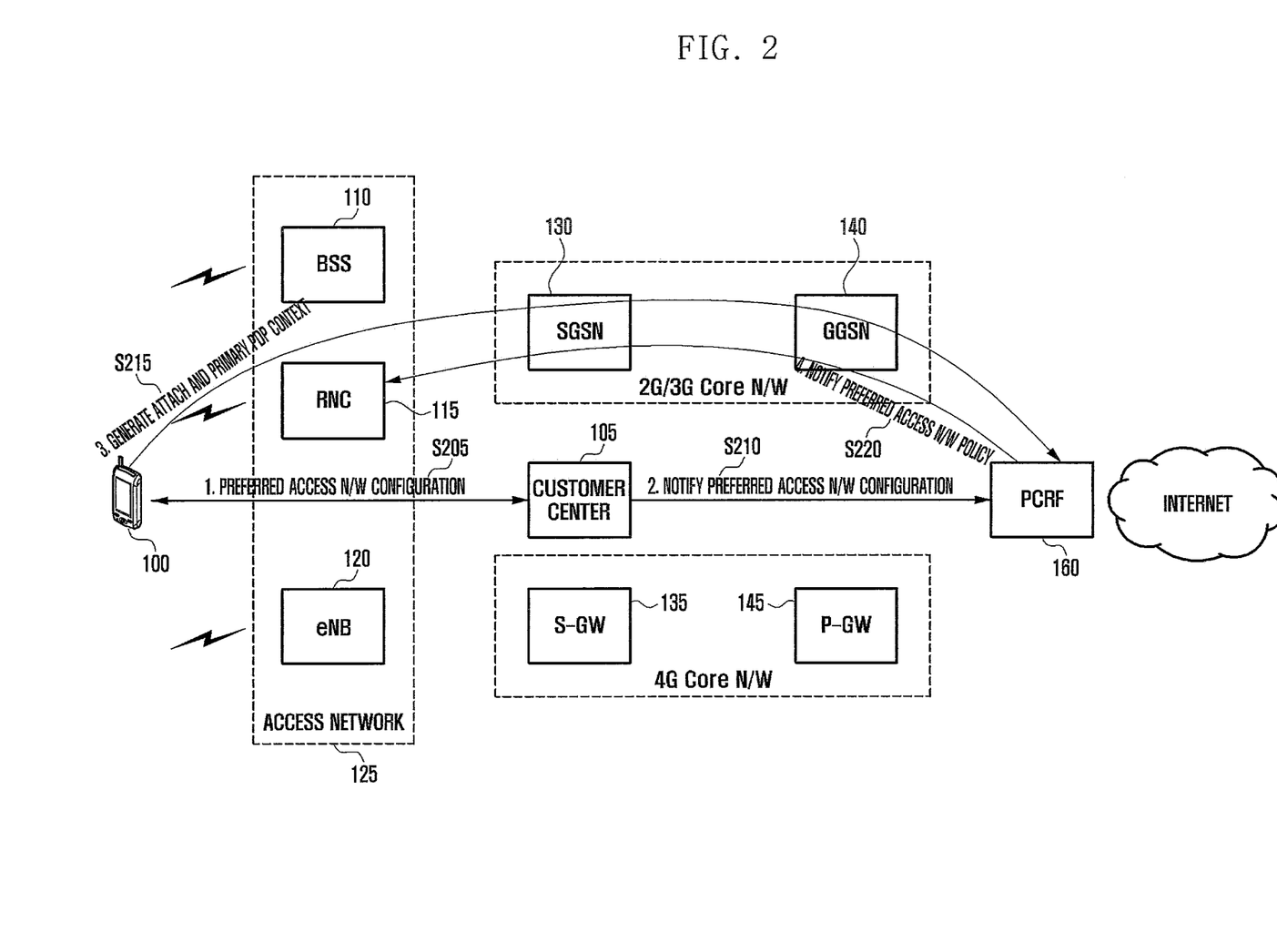
FIG. 2 is a diagram illustrating the dynamic access network selection policy configuration procedure according to an embodiment of the present disclosure.

FIG. 2 is a diagram illustrating the dynamic access network selection policy configuration procedure according to an embodiment of the present disclosure.

The terminal 100 and the customer center 105 are capable of configuring a subscriber-preferred access network at step S205. In the following description, this configuration is referred to as dynamic access network selection policy. The dynamic access network selection policy is capable of including at least one of default access network, per-service subscriber-preferred access network, and auxiliary access network to which the terminal moves according to the network situation such as traffic overload in the serving network.

The customer center 105 is capable of notifying the terminal of the dynamic access network selection policy when the dynamic access network selection policy is configured initially or modified.

In the initial access procedure, the terminal selects the default access network. Any of 2G, 3G, and 4G access networks can be configured as default network depending on the user's subscription information, preference, priority, and the like.

The per-service subscriber-preferred access network information can include information on the access network preferable according to application type, service type, and data amount. For example, the list of per application type preferred access network can be configured as shown in the exemplary table 1.

TABLE 1

| Application | Access network |
| --- | --- |
| Email | 2 G |
| Internet access | 3 G |
| Youtube | 4 G |
| — | — |
| — | — |

As shown in table 1, the user can configure the preferred access network per application to be executed.

The auxiliary access network is the access network to which the terminal makes a handover decision when abnormal situations occur in the serving network such as traffic overload.

The customer center 105 is capable of notifying the PCRF 160 of the dynamic access network selection policy when the policy is initially configured or is modified.

The terminal 100 attaches to the access network 125 at step S215. Upon attach to the access network 125, the terminal 100 receives the dynamic access network selection policy from the access network 125. The terminal 100 is also capable of attaching to the access network 125 based on the previously stored dynamic access network selection policy.

Also, the PCRF 160 is capable of providing the attached terminal 100 with the dynamic access network selection policy at step S220.

Figure 3:
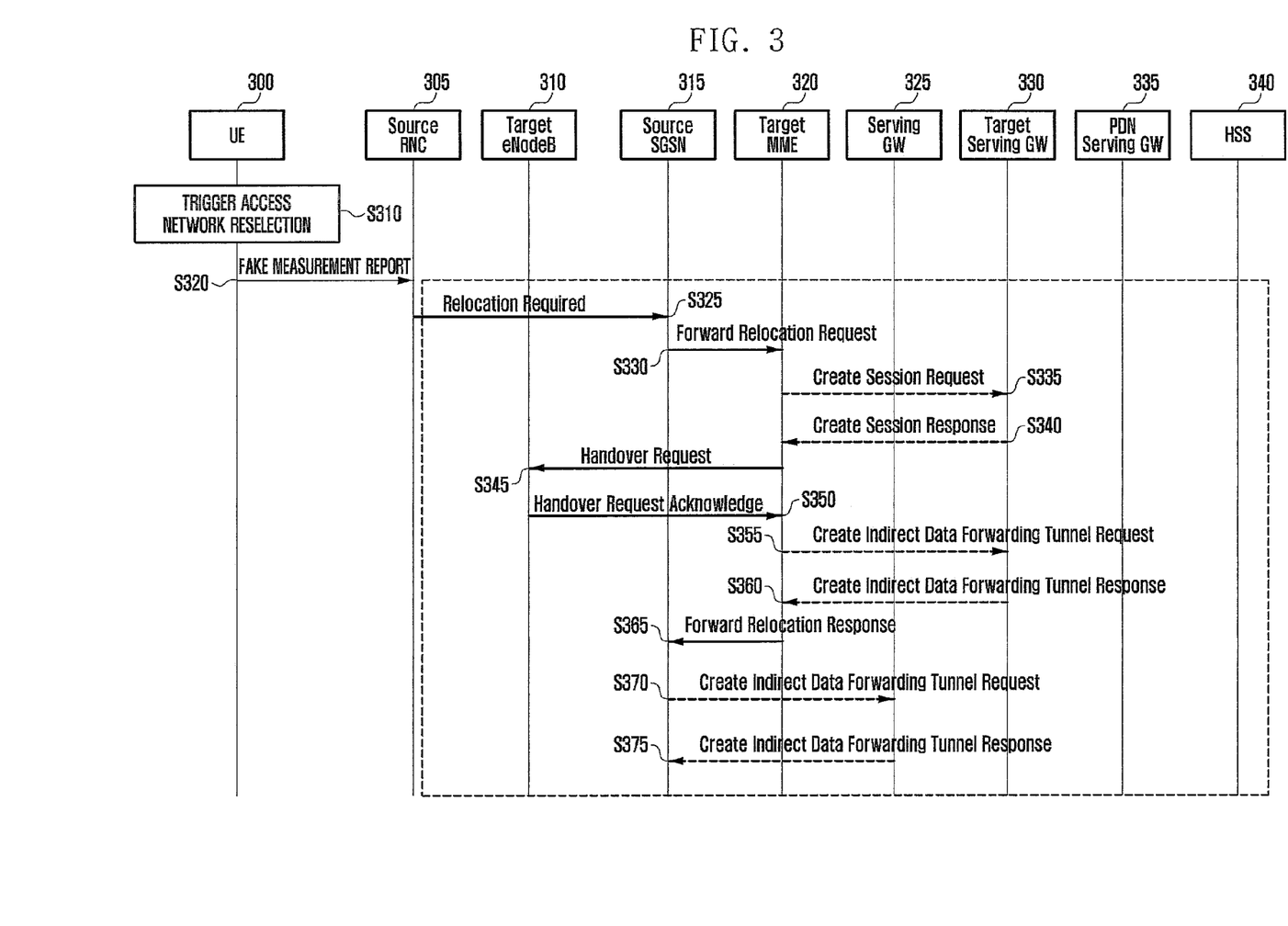
FIG. 3 is a signal flow diagram illustrating the dynamic access network selection policy configuration procedure triggered by the terminal according to an embodiment of the present disclosure.

FIG. 3 is a signal flow diagram illustrating the dynamic access network selection policy configuration procedure triggered by the terminal according to an embodiment of the present disclosure.

For the purpose of only illustration in FIG. 3, it is assumed that the terminal 300 has been configured with the dynamic network access policy through the procedure of FIG. 2. Also, it is assumed that the terminal 300 has been attached to a certain access network according to the dynamic network access selection policy. Although FIG. 3 is directed to the handover procedure from a 3G access network to a 4G access network, it is only for illustration purpose and the present disclosure is not limited thereto.

The terminal 300 which is served by the attached access network detects that access reselection is triggered at step S310. According to an embodiment of the present disclosure, the terminal 300 moves from the current access network to another access network according to types of the executed application, types of the provided service, and outbound/inbound traffic amount. If any occurrence of TCP retransmission, increase of radio transmission wait queue size, and exception handling of an application is detected, the terminal 300 regards that access reselection is triggered.

Next the terminal 300 selects a target access network for handover from the current serving access network. In this case, the terminal 300 selects the target access network according to the dynamic access network selection policy.

The terminal 300 generates a Fake Measurement Report message and transmits this message to the source RNC 305 at step S320. The Fake Measurement Report message is the measurement message indicating that the radio channel measurement result of the current serving access network is weaker than the radio channel measurement result of the target access network.

If the Fake Measurement Report message is received, the base station 305 prepares the procedure of handover to the target access network based on the Fake Measurement Result.

For this purpose, the source RNC 305 of the terminal 300 transmits a Relocation Required message to the source SGSN 315 at step S325. Upon receiving the Relocation Required message, the source SGSN 315 transmits a Forward Relocation Request message to the target MME 320 at step S330.

Upon receipt of the Forward Relocation Request message, the target MME 320 transmits a Create Session Request message to the target S-GW 330, the target S-GW 330 transmits a Create Session Response message to the target MME 320 in response to the Create Session Request message at step S340.

Upon receiving the Create Session Response message, the target MME 320 transmits a Handover Request message to the target eNB 310 at step S345, and the target eNB 310 transmits a Handover Request ACK message to the target MME 320 in response to the Handover Request message at step S350.

The target MME 320 transmits a Create Indirect Data Forwarding Tunnel :Request message to the target S-GW 330. Upon receiving the Create Indirect Data Forwarding Tunnel Request message, the target S-GW 330 transmits a Create Indirect Data Forwarding Tunnel Response message to the target MME 320.

The target MME 320 transmits a Forwarding Relocation Response message to the source SGSN 315 at step 5365. The source SGSN 315 transmits a Create Indirect Data Forwarding Tunnel Request message to the S-GW 325, and the S-GW 325 transmits a Create Indirect Data Forwarding Tunnel Response message to the SGSN 315.

Through the above described procedure, the terminal 300 is capable of re-attaching to an access network other than the current serving access network.

According to another embodiment of the present disclosure, if it has not started packet transmission yet, the terminal 300 is capable of performing Routing Area Update (RAU) or Tracking Area Update (TAU) to move to the target access network.

Figure 4:
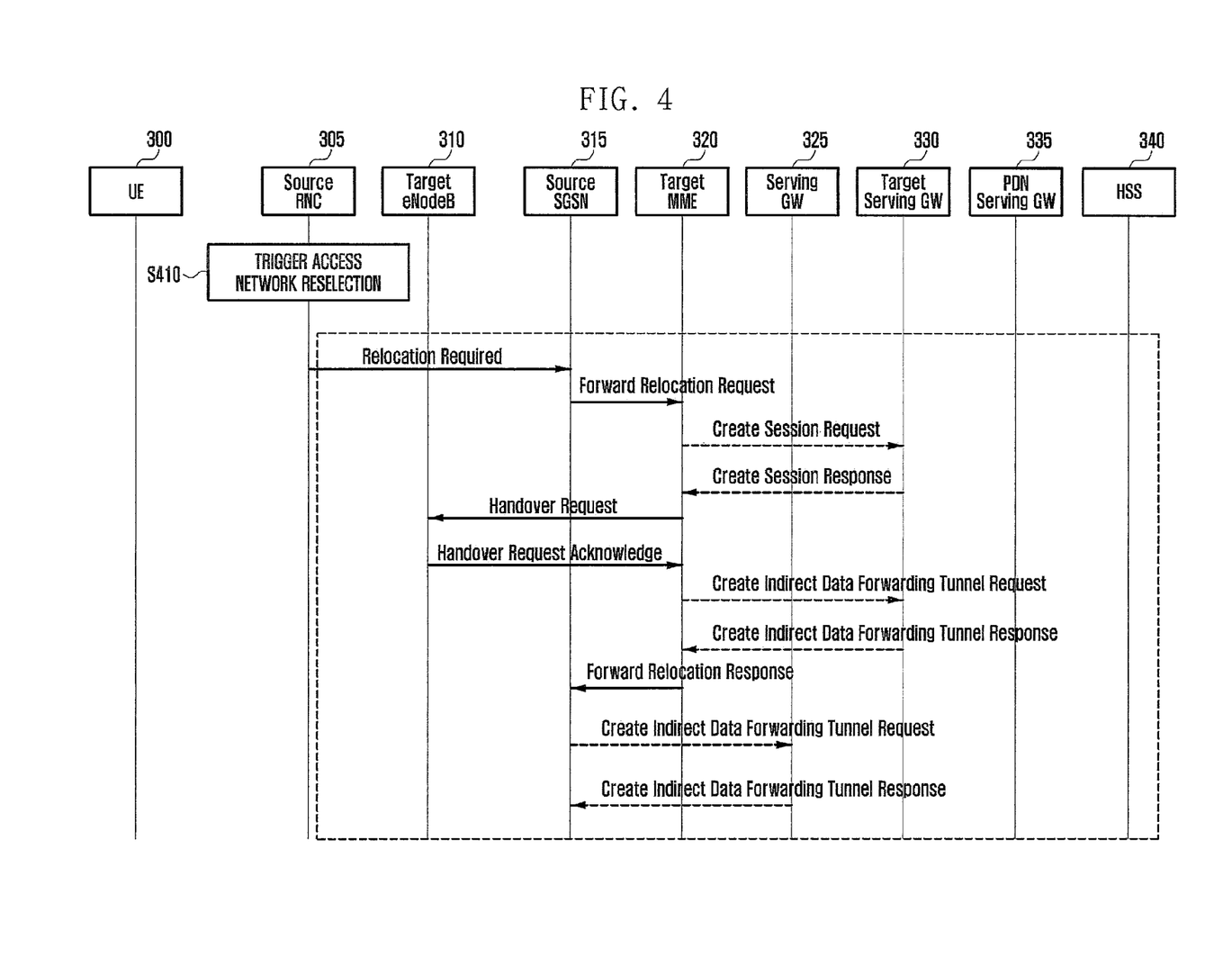
FIG. 4 is a signal flow diagram illustrating the dynamic access network selection policy configuration procedure triggered by the network according to an embodiment of the present disclosure.

FIG. 4 is a signal flow diagram illustrating the dynamic access network selection policy configuration procedure triggered by the network according to an embodiment of the present disclosure.

The access network such as BSS 110, RNC 115, and eNB 120 is capable of triggering access reselection when packet drop or delay caused by flow control is detected. That is, if it is detected that the traffic overload has caused radio resource shortage, the access network triggers access reselection through a PS handover procedure.

Referring to FIG. 4, the source RNC 305 detects that access reselection is triggered. As described above, the source RNC 305 is capable of triggering the access reselection of the terminal 300 when radio resource shortage is detected.

In this case, the terminal 300 and the access network and core network entities perform handover through following procedure. Since the terminal 300 handover procedure has been described with reference to FIG. 3, detailed description thereon is omitted herein.

Figure 5:
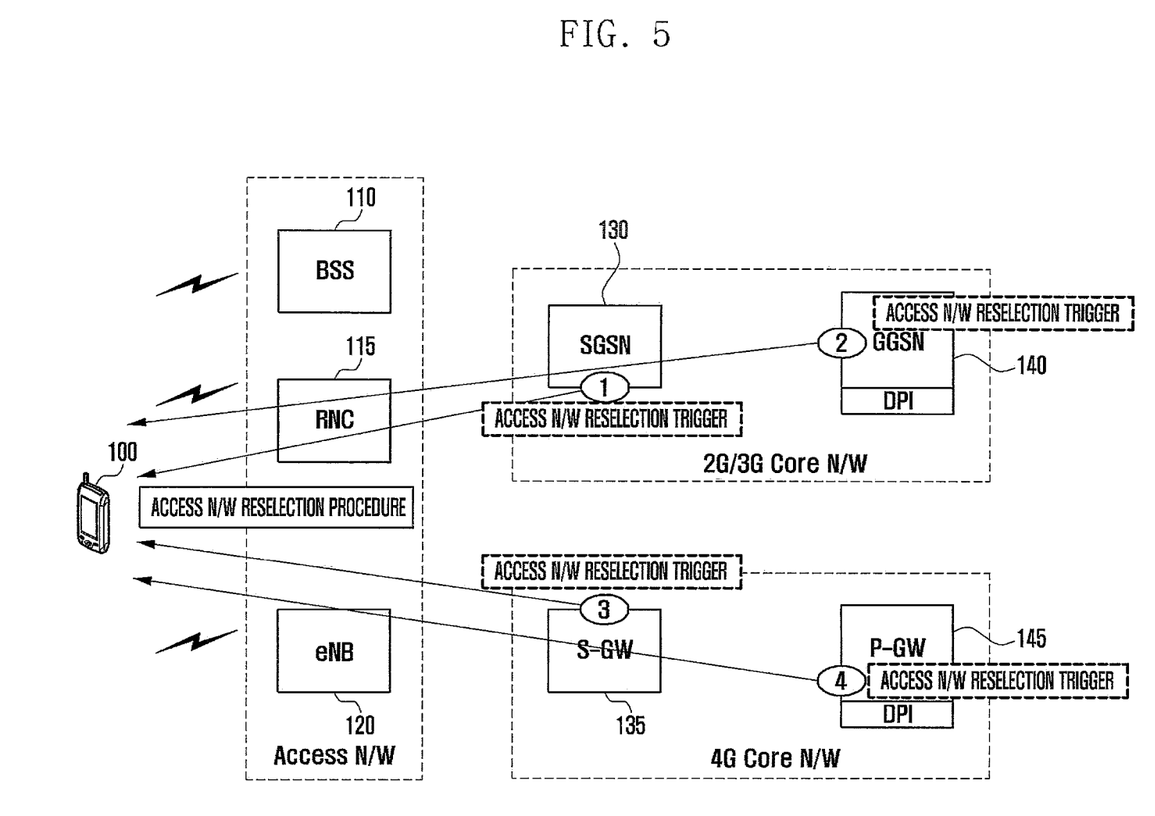
FIG. 5 is a diagram illustrating the dynamic access network selection policy configuration procedure according to another embodiment of the present disclosure.

FIG. 5 is a diagram illustrating the dynamic access network selection policy configuration procedure according to another embodiment of the present disclosure.

As shown in FIG. 5, the core network nodes of SGSN 130, GGSN 140, S-GW 135, and P-GW 145 are capable of requesting the access network nodes of BSS 110, RNC 115, and eNB 120 for access reselection. Upon receiving the access reselection request, the access network nodes of BSS 110, RNC 115, and eNB 120 perform PS handover procedure to switch the access network of the terminal 100 for another. In this case, the SGSN, GGSN, S-GW, and P-GW are capable of requesting the terminal for the access reselection using SMS messages or PDU negotiated with the terminal.

In more detail, when abnormal situations such as packet drop caused by QoS control or transmission delay is detected, the SGSN 130 is capable of requesting the terminal 100 for access reselection. Also, when abnormal situations such as packet drop caused by flow control per Base Station System GPRS Protocol Virtual Connection (BSSGP) Virtual Connection (BVC), flow control per terminal, and flow control per PFI, the 2G SGSN 130 is capable of requesting the terminal for access reselection. Also, when events such as LLC retransmission and transmission failure occur, it is possible to request the terminal 100 for access reselection. In this case, the SGSN 130 is capable of requesting the BSS 110 for FLUSH-LL before requesting for access network reselection, The GGSN 140 is capable of requesting the terminal 100 for access network reselection using the list of service-based preferred access network information and the list of data amount-based preferred access network information. The GGSN 140 is also capable of requesting the terminal 100 for access network reselection in situations such as system overload situation, packet drop caused by QoS control for the user, and delay.

The S-GW 135 is capable of requesting the terminal 100 for access network reselection in situations such as system overload, packet drop caused by QoS control for the user, and delay.

The P-GW 145 is capable of requesting the terminal for access network reselection using the list of service-based preferred access network information and data amount-based preferred access network information. The P-GW 145 is also capable of requesting the terminal for access network reselection in situations such as system overload situation, packet drop caused by QoS control for the user, and delay.

The terminal 100, BS 110, RNC 115, and eNB 120 are capable of maintaining the attachment to the current access network or selecting another access network according to the subscriber's or service provider's configuration when access network reselection is trigged in processing the voice call through circuit switched (CS) network.

According to an embodiment of the present disclosure, after establishing the attachment to another access network according to a service-based preferred access network selection policy, a terminal or a network can recover the attachment to the default access network upon completing the service or expiry of a timer.

Figure 6:
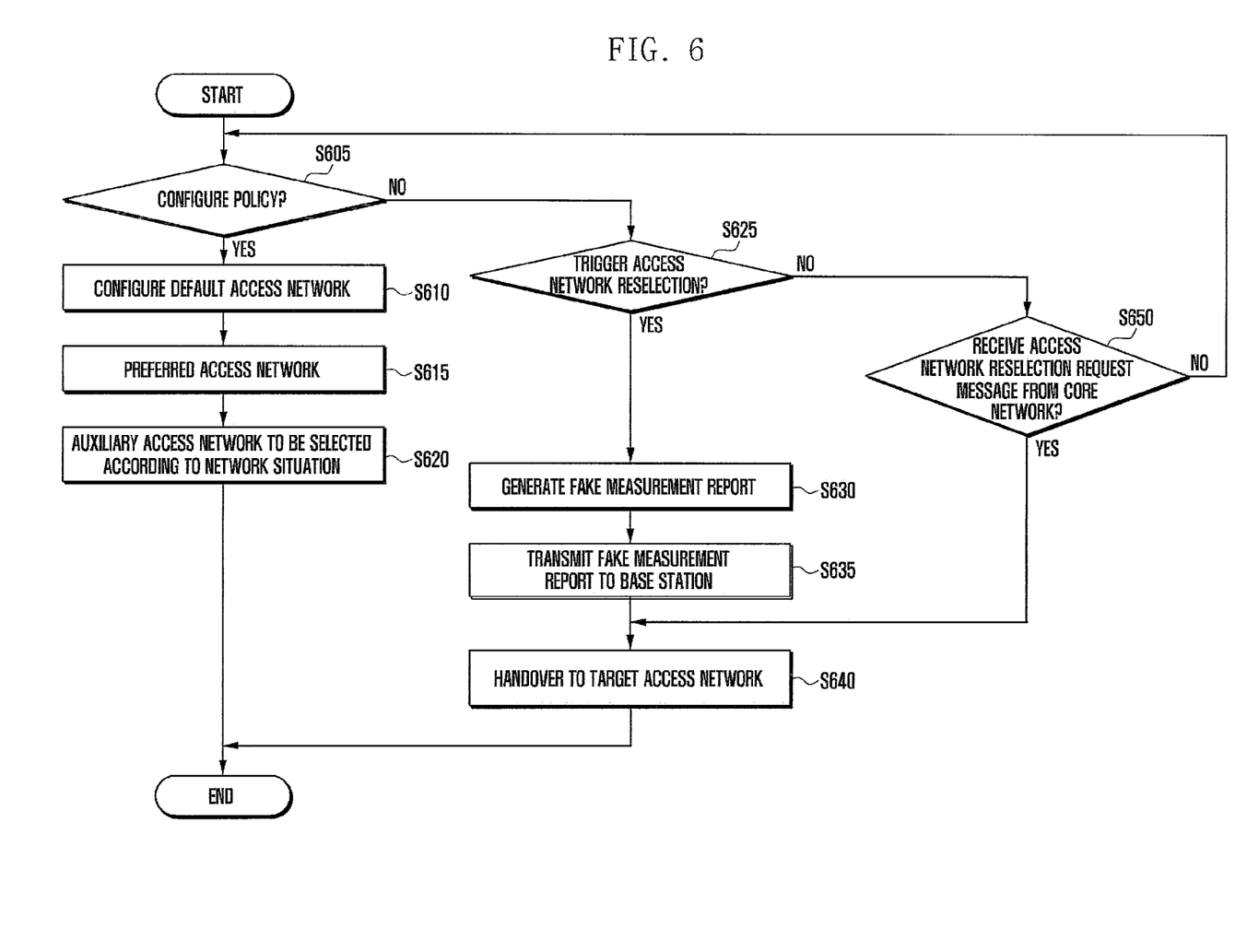
FIG. 6 is a flowchart illustrating the access network selection method based on the dynamic access network selection policy according to an embodiment of the present disclosure.

FIG. 6 is a flowchart illustrating the access network selection method based on the dynamic access network selection policy according to an embodiment of the present disclosure.

The terminal 100 first determines whether a dynamic access network selection policy configuration is requested at step S605. The dynamic access network selection policy can be configured through the interface of the terminal 100 or through interoperation with the customer center 105.

If the dynamic access network selection policy configuration is requested, the terminal 100 configures a default access network at step S610. The default access network is the access network configured to be selected as default in the initial attach to the network when the terminal is powered on. For example, the terminal 100 can be configured to attach to the 3G network as default access network for voice call or data communication.

Next, the terminal 100 configures a preferred access network at step S615. The preferred access network information can include the information on the access network preferable according to application type, service type, and data amount.

Next, the terminal 100 configures an auxiliary access network to be selected according to network situations at step S620. The auxiliary access network is the access network to which the terminal served by a certain access network performs handover when a certain abnormal situation such that traffic overload occurs.

Although FIG. 6 is directed to the case that steps S610 to S620 are performed in sequence, the present disclosure is not limited thereto. For example, the preferred access network can be configured first.

Returning to step S605, if the dynamic access network selection policy configuration is not requested, the terminal 100 determines whether access network reselection is triggered at step S625. The access network reselection can be triggered by abnormal situations such as execution of specific application, occurrence of network overload, transmission/reception of data equal to or greater than a predetermined size, occurrence of TCP retransmission, increase of radio transmission wait queue size, and exceptional handling of application.

If the access network reselection is triggered, the terminal 100 generates a fake measurement report message at step S630. The fake measurement report message is the measurement message including the radio channel measurement result of the current serving access network which is configured to be less than the radio channel measurement result of the target access network.

The terminal 100 transmits the fake measurement report message to the base station controlling the access network serving the terminal 100 currently at step S635. Upon receiving the fake measurement report message, the base station prepares for handover to the target access network based on the fake measurement report.

If the handover is prepared completely, the terminal 100 performs handover to the target access network at step S640.

The above description has been directed to the procedure where the terminal 100 determines whether the access network reselection is triggered by itself and performs the handover to the target access network based on the determination result.

According to another embodiment of the present disclosure, a certain node of the access network or the core network is capable of triggering the access network reselection of the terminal 100, and this is depicted as step S650.

At step S650, if an access network reselection request message is received from a certain node of the access network or the core network, the terminal 100 performs handover to the target network at step S640.

Figure 7:
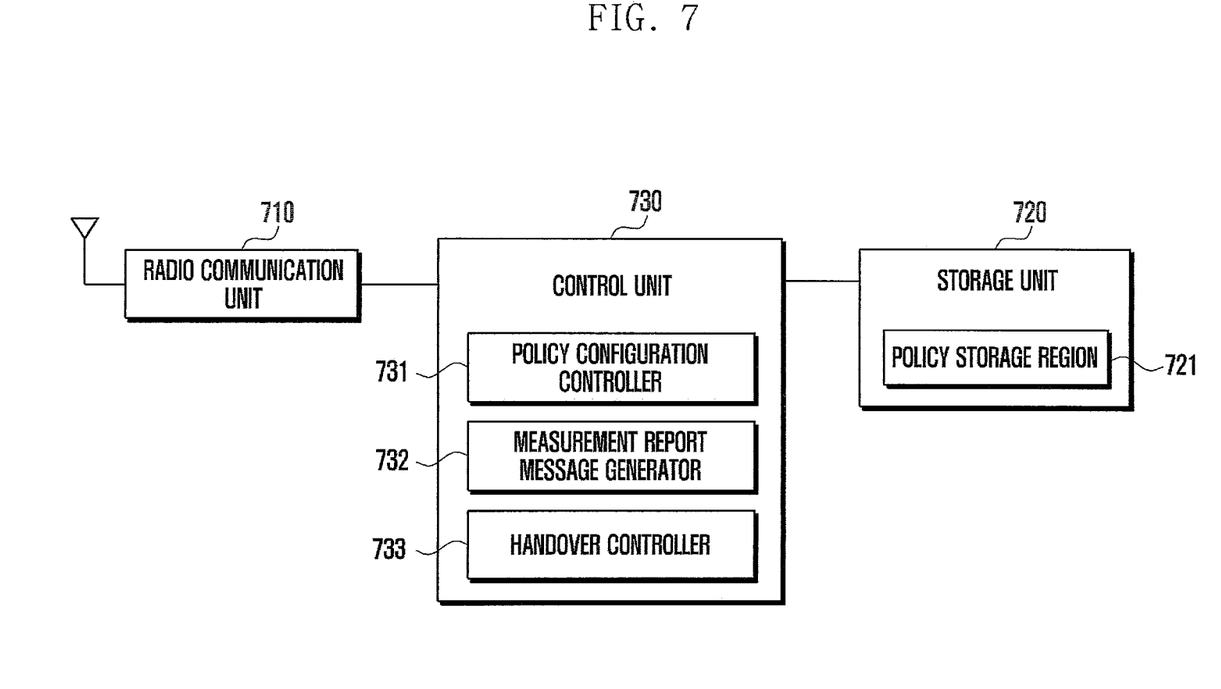
FIG. 7 is a block diagram illustrating the configuration of the terminal according to an embodiment of the present disclosure.

FIG. 7 is a block diagram illustrating the configuration of the terminal according to an embodiment of the present disclosure. As shown in FIG. 7, the terminal according to an embodiment of the present disclosure includes a radio communication unit 710, a storage unit 720 and a control unit 730.

The radio communication unit 710 is responsible for communicating various data and control information with the access network.

The storage unit 720 stores programs and data associated with the dynamic access network selection function of the terminal. According to an embodiment of the present disclosure, the storage unit 720 includes a policy storage region for storing the information on the default access network, per-service preferred access network, and auxiliary access network to be selected according to the network situation.

The control unit 730 controls overall operations associated with the dynamic access network selection of the terminal. For this purpose, the control unit 730 includes a policy configuration controller 731, a measurement report message generator 732, and a handover controller 733.

The policy configuration controller 731 controls the procedure for configuring a dynamic access network selection policy by itself or in interoperation with the customer center 105. The policy configuration controller 731 is capable of controlling the procedure for configuring at least one of the default access network, the list of per-service subscriber preferred access network, and the auxiliary access network to be selected when abnormal situations such that traffic overload is detected in the service access network.

The measurement report generator 732 measures the channel state of the serving and neighbor base stations to generate a measurement report message including the measurement result and transmits the measurement report message to the serving base station. According to an embodiment of the present disclosure, if an access network reselection trigger is detected, the measurement report message generator 732 generates a fake measurement report message and controls transmitting the fake measurement report message to the service base station. The fake measurement report message is the measurement message including the radio channel measurement result of the current serving access network which is configured to be less than the radio channel measurement result of the target access network.

If the access network reselection trigger is detected or if an access network reselection request message is received from the access network and/or the core network, the handover controller 733 controls the handover to the target access network.

Although the control unit 730 is depicted as a separate function block responsible for different functions in FIG. 7, the structure of the controller 730 is not limited to such configuration. For example, the policy configuration controller 731 can be integrated into the control unit 730 such that the control unit 730 performs the function of the policy configuration controller 731.

As described above, the dynamic access network selection method and apparatus of the present disclosure designates a user-preferred default access network such that the access network serving the frequently used service is selected with priority.

Also, the dynamic access network selection method and apparatus of the present disclosure is capable of configuring per-application, per-service, and data amount-based user-preferred access network in order for the terminal to select the access network dynamically, resulting in improvement of service quality.

Although exemplary embodiments of the present disclosure have been described in detail hereinabove with specific terminology, this is for the purpose of describing particular embodiments only and not intended to be limiting of the disclosure. While particular embodiments of the present disclosure have been illustrated and described, it would be obvious to those skilled in the art that various other changes and modifications can be made without departing from the spirit and scope of the disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An access network selection method for a terminal in a wireless communication system supporting an attachment to at least two access networks simultaneously in a same area, the method comprising:
    detecting an event triggering access network reselection for the terminal;
    selecting a target access network, based on an access network selection policy configured by a user, for the terminal to move to;
    generating a fake measurement report message indicating that a radio channel measurement result of a source access network is weaker than a radio channel measurement result of the target access network; and
    performing handover to the target access network by transmitting the fake measurement report message.

2. The method of claim 1, further comprising before detecting the event: configuring a dynamic access network selection policy assigning priority to at least one access network to which the terminal is attachable.

3. The method of claim 2, wherein the dynamic access network selection policy comprises at least one of a default access network, a list of per-service preferred access networks, and an auxiliary access network which the terminal reattaches to when traffic overload occurs in the source access network.

4. The method of claim 3, wherein the per-service preferred access network comprises at least one of a list of application priority-based preferred access networks, a list of service priority-based access networks, and a list of data amount priority-base access networks.

5. The method of claim 2, further comprises:
    transmitting the dynamic access network selection policy from a customer center to a Policy and Charging Resource Function (PCRF).

6. The method of claim 1, further comprising:
    initiating a handover procedure upon receiving an access network reselection request message from a core network connected to the access network.

7. The method of claim 6, wherein the access network reselection request message is generated upon occurrence of at least one event of system overload, packet drop caused by Quality of Service (QoS) control for the user, and delay.

8. The method of claim 1, wherein performing handover comprises limiting a number of handovers to a predetermined number in a predetermined duration.

9. An access network selection method for a terminal in a wireless communication system supporting an attachment to at least two access networks simultaneously in a same area, the method comprising:
    configuring a dynamic access network selection policy assigning priority to at least one access network to which the terminal is capable of attaching;
    detecting an event triggering access network reselection for the terminal;

selecting a target access network for the terminal to move to according to the dynamic access network selection policy; and performing handover to the target access network.

10. The method of claim 9, wherein the handover is performed by transmitting the fake measurement report message indicating that a radio channel measurement result of a source access network is weaker than a radio channel measurement result of the target access network.

11. A terminal for selecting an access network dynamically in a wireless communication system supporting an attachment to at least two access networks simultaneously in a same area, the terminal comprising:

a radio communication unit configured to communicate with the access network; and a control unit configured to detect an event triggering access network reselection of the terminal, select a target access network, based on an access network selection policy configured by users, for the terminal to move to, generate a fake measurement report message indicating that a radio channel measurement result of a source access network is weaker than a radio channel measurement result of the target access network, and perform handover to the target access network by transmitting the fake measurement report message.

12. The terminal of claim 11, wherein before detecting the event, the control unit is configured to configure a dynamic access network selection policy assigning priority to at least one access network to which the terminal is attachable.

13. The terminal of claim 11, wherein the dynamic access network selection policy comprises at least one of a default access network, a list of per-service preferred access networks, and an auxiliary access network which the terminal reattaches when traffic overload occurs in the source access network.

14. The terminal of claim 13, wherein the per-service preferred access network comprises at least one of a list of application priority-based preferred access networks, a list of service priority-based access networks, and a list of data amount priority-base access networks.

15. The terminal of claim 12, wherein the control unit is configured to control transmitting the dynamic access network selection policy from a customer center to a Policy and Charging Resource Function (PCRF).

16. The terminal of claim 12, wherein the control unit is configured to control initiating a handover procedure upon receiving an access network reselection request message from a core network connected to the access network.

17. The terminal of claim 16, wherein the access network reselection request message is generated upon occurrence of at least one of system overload, packet drop caused by Quality of Service (QoS) control for a user, and delay.

18. The terminal of claim 11, wherein the control unit is configured to limit a number of handovers to a predetermined number in a predetermined duration.

19. A terminal for selecting an access network dynamically in a wireless communication system supporting an attachment to at least two access networks simultaneously in a same area, the terminal comprising:

a radio communication unit configured to communicate with the access network; and a control unit configured to configure a dynamic access network selection policy assigning priority to at least one access network to which the terminal is attachable, detect an event triggering access network reselection of the terminal, select a target access network for the terminal to move to according to the dynamic access network selection policy and perform handover to the target access network.

20. The terminal of claim 19, wherein the control unit is configured to transmit a fake measurement report message indicating that a radio channel measurement result of a source access network is weaker than a radio channel measurement result of the target access network via the radio communication unit.

* * * * *